United States Statutory Invention Registration [19]

[11] Reg. Number: H628

McIngvale [43] Published: Apr. 4, 1989

[54] UNIVERSAL AUTOMATIC LANDING SYSTEM FOR REMOTE PILOTED VEHICLES

[75] Inventor: Pat H. McIngvale, Huntsville, Ala.

[73] Assignee: The United States of America as represented by the Secretary of the Army, Washington, D.C.

[21] Appl. No.: 182,603

[22] Filed: Apr. 18, 1988

[51] Int. Cl.[4] ..... G01S 13/91

[52] U.S. Cl. ..... 342/33; 342/62; 342/63; 342/120

*Primary Examiner*—Stephen C. Buczinski
*Assistant Examiner*—Linda J. Wallace
*Attorney, Agent, or Firm*—John C. Garvin, Jr.; Freddie M. Bush; James T. Deaton

[57] ABSTRACT

An automatic landing system for landing remotely piloted flying vehicles along a predetermined path and at a predetermined point. The system includes an autopilot carried by the flying vehicle for measuring the parameters of attitude, airspeed, and heading and for comparing the measured parameters with the inputted parameters for the desired attitude, airspeed and heading. The autopilot adjusts the vehicle controls to make it conform to the desired attitude, airspeed and heading when deviations therefrom are detected. The system includes a radar transmitter and receiver means disposed on a stabilized double gimbal for measuring the actual heading and distance from the vehicle to the radar transmitter and receiver on a continuous basis. Control means are provided for receiving signals from the radar transmitter and receiver, computing actual and desired angles and altitude and for comparing the actual parameters with the desired parameters and for instructing the autopilot in overcoming any deviations detected therein.

6 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

UNIVERSAL AUTOMATIC LANDING SYSTEM FOR REMOTE PILOTED VEHICLES

DEDICATORY CLAUSE

The invention described herein may be manufactured, used, and licensed by or for the U.S. Government for governmental purposes without the payment to me of any royalties thereon.

BACKGROUND OF THE INVENTION

This invention relates to an automatic landing system which can be incorporated into any remotely piloted vehicle system where the aircraft or vehicle can be landed on wheels or skids or the system can be utilized to guide aircraft into a recovery net.

This system requires no addition to the remotely piloted vehicle and only minor interface connections with the ground control system for such vehicles. The automatic landing system uses state-of-the-art hardware which is available, and which is combined in a unique way to make landing of the remotely piloted vehicles easier for unskilled operators, and is completely automatic.

In one known system for automatic landing or recovering of remotely piloted aircraft or a remotely piloted vehicle, an electro-optical sensor is provided on the landing net structure which may be either a television or a forward looking infrared device, or similar device which tracks a beacon which is mounted on the nose of the aircraft. In this system the electro-optical sensor on the net structure tracks the beacon, and any errors arising from an incorrect flight path, that is, the failure of the air vehicle to fly directly towards the net, are used as commands, either manually or automatically, to the air vehicle through the ground control station to correct the aircraft's flight path. One problem with this system is that each aircraft is required to have a particular type of beacon and may become unreliable in weather conditions of low visibility for the television or infrared sensors and can be used only for recovering the remotely piloted vehicle in a net.

Another known type of instrument approach is that used with manned aircraft (known as a ground control approach) that uses a precision radar to track the aircraft's approach, that is, both its glideslope and its heading. This system uses a ground controller to interpret the radar display and to advise the pilot of the manned aircraft as to needed corrections in the flight path. This system is not adaptable to remotely piloted vehicles.

SUMMARY OF THE INVENTION

It is an object of the invention to provide an automatic landing system for remotely piloted flying vehicles.

It is a further object of the invention to provide an automatic landing system for landing remotely piloted flying vehicles which does not require modification of the remotely piloted vehicle.

It is yet another object of the invention to provide an automatic landing system for remotely piloted flying vehicles which includes a sensor for sensing the altitude and angular displacement of the remotely piloted vehicle at any distance.

It is still another object of the invention to provide an automatic landing system for remotely piloted flying vehicles which includes a sensor device for sensing the altitude and angular displacement of the remotely flying vehicle along a path offset from said detector.

These and other objects, which will become apparent, are accomplished by an automatic landing system which comprises a narrow beam radar seeker/sensor unit which is mounted on a two-axis pitch and yaw axis gimbal which is used to track the remotely piloted air vehicle from a predetermined point in space from where the landing approach begins to a point just above the earth where the unmanned aircraft touches down. The radar seeker/sensor and its gimbal set measures the pitch and the yaw angles of the tracking beam and the range to the air vehicle. These angles and the range are used to compute the height above the terrain and to determine whether the path of the aircraft conforms to the desired path to bring the unmanned vehicle to the safe landing at the predetermined touch down point.

The sensor/seeker and its associated microprocessor calculates errors in the desired flight path which, in turn, are input to the automatic controls as instructions or corrections for the air vehicle's flight path. The design characteristic of the air vehicle are used in determining the predetermined glideslope for the space provided for the landing of the aircraft. The necessary geometrical relationships which the seeker/sensor microprocessor solve to determine conformance to the desired flight path, are derived from the measurements made by the seeker/sensor.

BRIEF DESCRIPTION OF THE DRAWINGS

The invention will now be described in connection with the appended drawings, wherein.

DETAILED DESCRIPTION OF THE DRAWING

Figure 1:
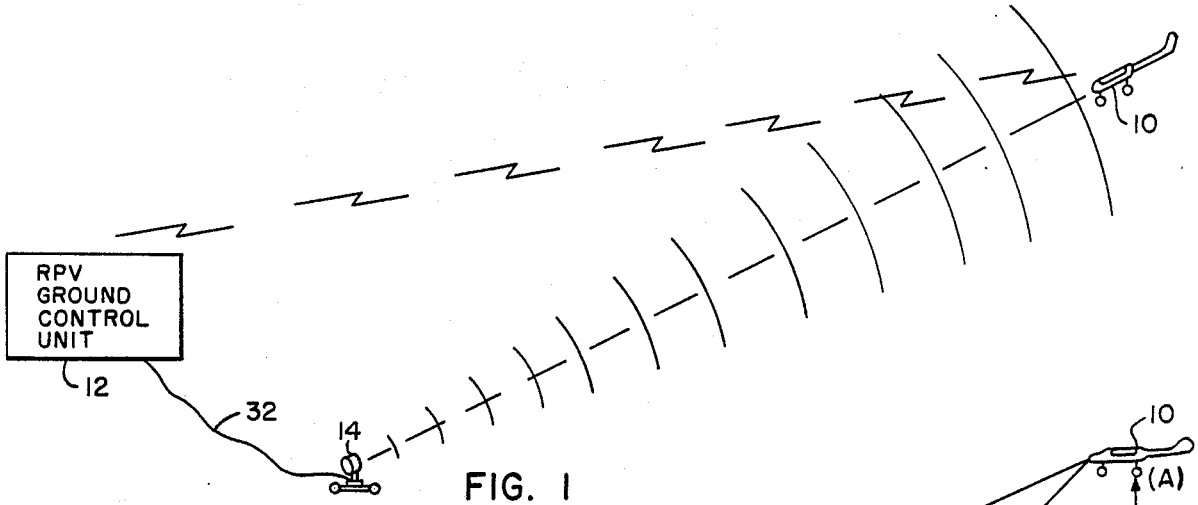
FIG. 1 is a perspective view of the automatic landing system of the invention.

Referring now to FIG. 1 of the drawings, the automatic landing system of the invention comprises a remotely piloted air vehicle 10, a ground control unit 12 and a stabilized radar seeker/sensor tracking unit 14. Each of the subsystems of the invention are bought and marketed, but their basic operation will be briefly described before describing the operation of the automatic landing system of the invention.

The remotely piloted air vehicle 10 and the ground control unit 12 comprise the major components of an unmanned aerial vehicle and may be a remotely piloted vehicle system such as that known as the PIONEER system built by the Tadrian Corporation of Israel and AAI, Incorporated of Baltimore, Md., the HERON 26, built by the Pacific Advanced Engineering Company of San Diego, Calif.; and the SKYEYE built by Developmental Science Division of the G.E.C. Avionics, Inc. of Ontario, Calif. Other manufacturers manufacture similar units but all of these operate essentially in the same manner. The air vehicle 10 is a miniature, fixed wing aircraft, usually powered by a propeller or a jet which contains an automatic pilot (which will be described in more detail later) which comprises gyroscopes or other instruments to measure the altitude and heading of the aircraft and electronically responsive controls. The automatic pilot controls the aircraft to fly a desired altitude and heading.

There are numerous manifestations of these autopilots, all of which operate by the principal of measuring the parameters of interest, i.e., attitude, airspeed, heading, altitude, and the like, and comparing the measured parameters with the desired values for those parameters. The difference between the measured parameters and the desired parameters indicate an error which the autopilot uses to make a change in the aircraft performance to correct the error.

The remote operator, in the ground control unit 12, commands the aircraft by changing the reference parameters or by inputting a desired action. For example, the operator may command the aircraft to make a right turn and the auto pilot will determine what adjustments are required in the aileron, rudder, elevator, and the engine controls to cause the air vehicle to conform to the command. Commands from the ground control unit 12, are transmitted by a radio frequency to a receiver in the unmanned aircraft.

The millimeter wave radar seeker/sensor tracking unit 14 is a miniature radar transmitter/receiver which is capable of tracking an object (in this case the flying air vehicle) and measuring both its angular deviation from a reference axis and its range from the transmitter/receiver. The technology for such devices is well known and there are many companies and individuals engaged in designing and building radar frequency sensor systems. These devices are commonly used as missile seekers for accurately tracking targets, as sensors for remotely piloted vehicles, in manned aircraft in target acquisition devices, and for helicopter and other aircraft detection and tracking by air defense weapon systems.

Figure 4:
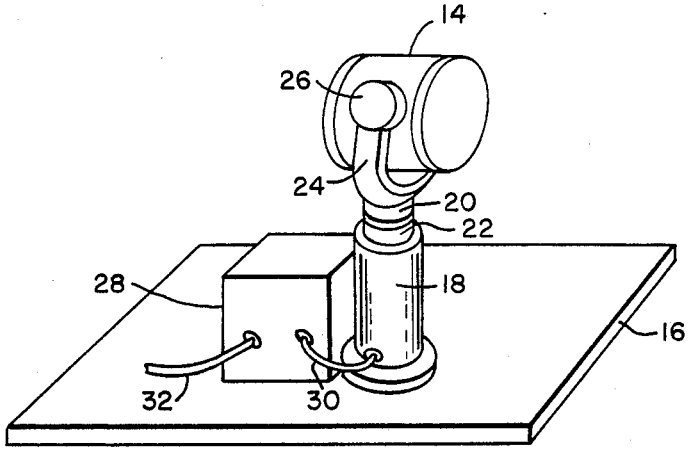
FIG. 4 is a perspective view of the radar seeker/sensor unit of the invention.
Figure 5:
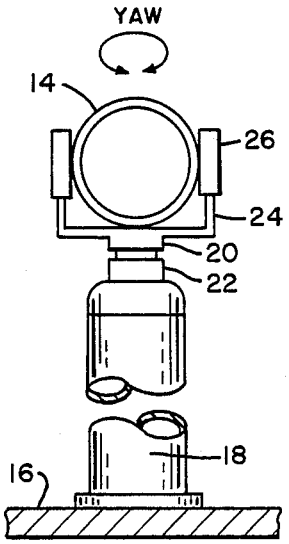
FIG. 5 is a rear elevation view of the radar seeker/-sensor unit shown in FIG. 4.
Figure 6:
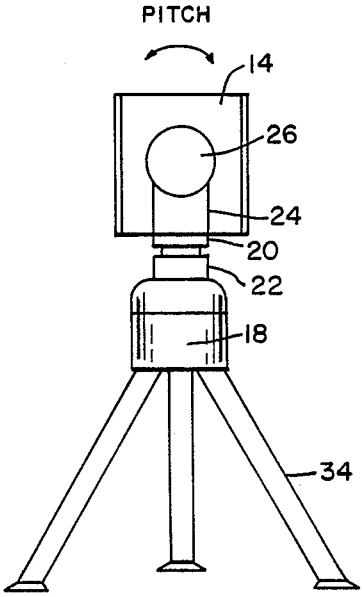
FIG. 6 is a side view of the radar seeker/sensor unit of FIG. 5 but showing it mounted on a tripod rather than a platform.

The basic radar seeker/sensor 14 is mounted on a stabilized gimbal (as seen in FIGS. 4, 5, and 6) which allow it to track an object over a wide angular excursion, as will be described in detail hereinafter. The sensor/seeker and its mount are disposed on a trailer, truck bed or a portable tripod so that it can be set up at the site of an intended landing.

Referring now to FIG. 5 it will be noted that the stabilized radar seeker/sensor and tracking unit 14 is mounted on a pedestal mount 16, which may be the flatbed of a truck or otherwise, on which is supported a gimbal support shaft 18 by plurality a of machine bolts (not shown). Gimbal support shaft 18 has mounted on its end a yaw gimbal 20 and a yaw torque motor 22 which is adapted to pivot yaw gimbal 20 relative to the support shaft 18 in either a clockwise or a counterclockwise direction.

Mounted on the end of yaw gimbal 20 is a pitch gimbal 24 which comprises two upstanding arms disposed on either side of the radar seeker/sensor device. Pitch gimbal 24 also comprises a pitch gimbal motor 26, which pivots the radar seeker/sensor within the arms of supporting gimbal 24. The stabilized radar seeker/sensor tracking unit 14 homes in on the remotely piloted vehicle and generates a signal responsive to the angle of glideslope and the heading of the remotely piloted vehicle. These signals are transmitted to a microprocessor and control mechanism 28, which may be supported by the pedestal 16, through a seeker cable 30. The microprocessor 28 generates signals and transmits them to the control unit 12, by means of a control unit cable 32, where the signals are utilized to adjust the flight path of the remotely piloted vehicle to make it conform to the flight path predetermined to be the optimum for the landing of the remotely piloted vehicle under the circumstances, and in accordance with the vehicle's operational configuration.

As seen in FIG. 6, the gimbal supporting the radar seeker/sensor and tracking unit 14 may be mounted on a tripod 34 instead of the pedestal illustrated in FIGS. 4 and 5.

Figure 2:
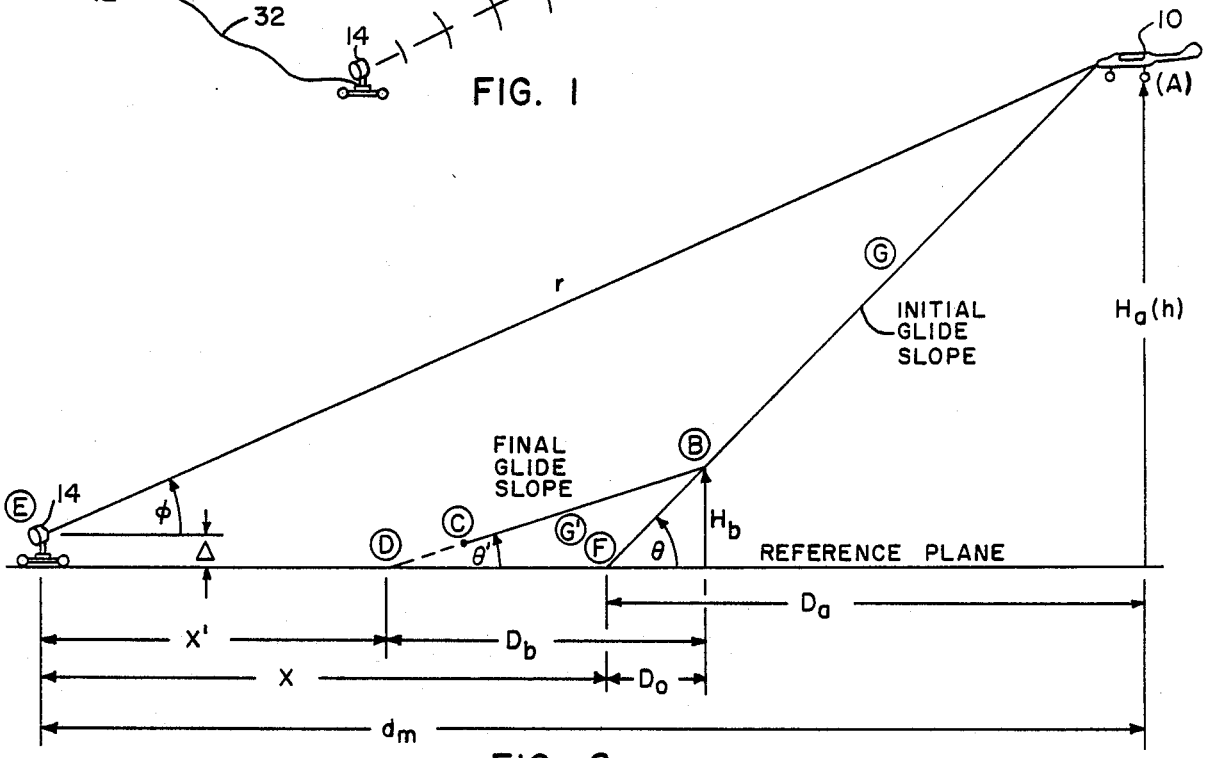
FIG. 2 is a diagrammatic side view of the glideslope controls of the invention.
Figure 3:
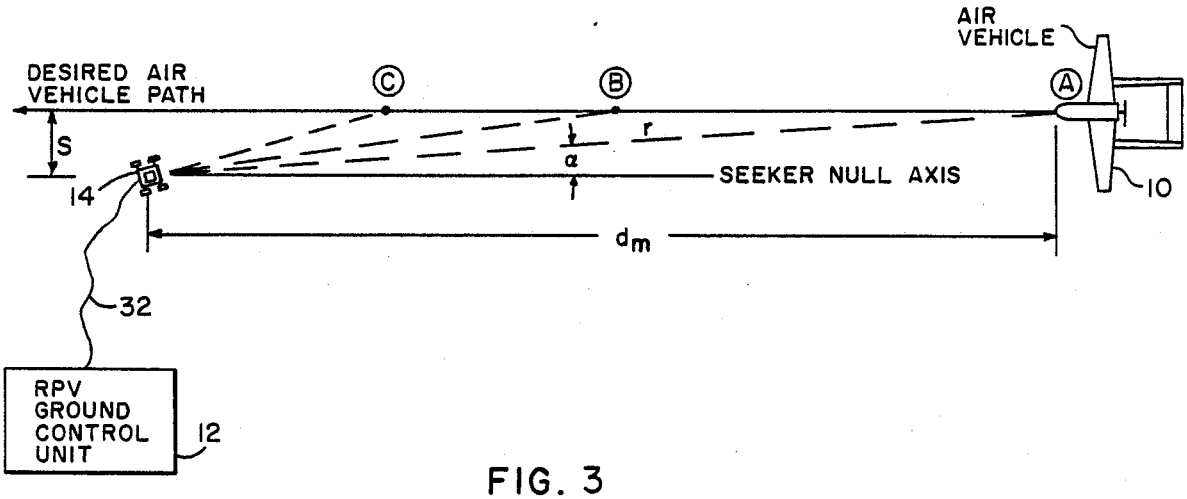
FIG. 3 is a diagrammatic plan view of the yaw control for the automatic landing system of the invention.
Figure 7:
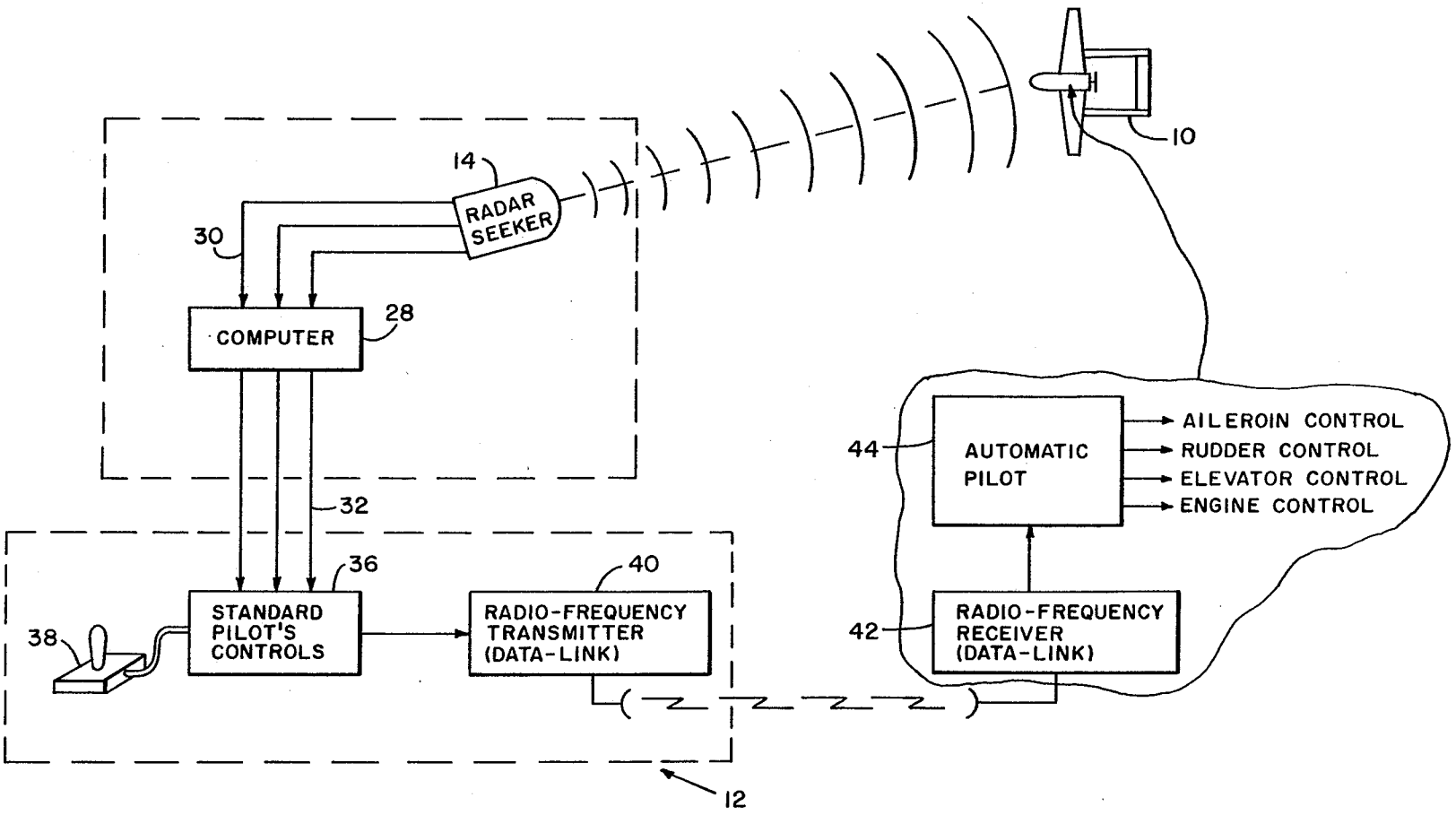
FIG. 7 is a schematic diagram illustrating the operation of the invention.

Referring now to FIGS. 2, 3, and 7, it will be noted that the remotely piloted aircraft 10 is controlled by the ground operator through manual control 38 and standard controls 36 through a data link transmitter 40 which transmits instructions to the autopilot 44 through a data link receiver 42 until the remotely piloted vehicle reaches point A, as seen in FIG. 2. When the remotely piloted aircraft reaches point A, the manual controls of the aircraft may be overridden and the automatic system takes control of the aircraft and lands it. Alternately, the operator may initiate the automatic system. As seen in FIGS. 2 and 3, the radar seeker/sensor and tracking unit is mounted on the gimbal a predetermined distance off the ground and spaced a predetermined distance from the landing path of the remotely piloted vehicle. The aircraft 10 is guided in an initial guideslope A-F until it reaches point B. Upon reaching point B, the guideslope of the remotely piloted vehicle is altered to a final glideslope B-D until it reaches a touch down point C.

As seen in FIG. 3, the desired heading for the remotely piloted vehicle 10 carries it through point A, B, and C which are parallel to a base line and null axis, established by the control and microprocessor 28.

The operation of the invention will now be described in connection with FIGS. 7, 8, and 9, as well as FIGS. 2 and 3.

The air vehicle 10 is flown to the final approach waypoint or location A by commands from the ground control unit or by pre-programmed commands stored in the autopilot in the usual manner. In the vicinity of this final approach fix (point A of FIG. 2), the air vehicle altitude, heading, and air-speed will all be as required to initiate landing for the particular aircraft design. This is standard practice for remotely piloted (or manned) aircraft and requires no special consideration for the application of this invention.

Through geometrical considerations (to be discussed later) and desired altitude to initiate the final approach to landing, the position of point A (final approach fix) with respect to the radar seeker/sensor is determined and the seeker is made to point at that position in space. As the air vehicle approaches point A, the seeker/sensor detects it and the remotely piloted vehicle 10 operator may initiate automatic tracking, usually by placing a "tracking gate" over the air vehicle return on the radar image.

From this event forward, all actions are automatic and independent of the human operator. Because the seeker/sensor can begin tracking the air vehicle prior to its reaching point A, it is able to measure parameters (angle $\phi$ and range r of FIG. 2) which allow determination of when point A is reached (a specific distance from, and altitude above the seeker/sensor). When that determination is made, the command is given to the air vehicle to begin its initial approach. Depending on the individual remotely piloted vehicle design, this command might be "descend at 500 feet/minute on a heading of 30 degrees" or it might be "decrease power to 60 percent, increase pitch up angle by 10 degrees, maintain constant heading". Of course, many possibilities exist for variations on this scenario and any command that will cause the aircraft to descend at the predetermined constant rate and heading will be satisfactory.

Stored within the landing system computer 28 memory are equations (to be discussed later) and parameters for computing the desired altitude H for any range r from seeker/sensor to the air vehicle. Therefore, the seeker measures actual range r and angle $\phi$ as the aircraft descends, the associated computer calculates actual altitude h and compares it to the desired value (as will be described in detail later). If the two values do not agree, the command is given to the air vehicle (via the ground control unit and data link) to increase or decrease the rate of descent. Therefore, the air vehicle is constrained to fly small perturbations about the desired glideslope so that it does not get low enough to collide with obstacles but is brought to a position to land on the runway.

As the air vehicle nears the ground, its rate of descent must be slowed so that is will touch down with a relatively low forward velocity and a low downward velocity to prevent damage to the vehicle. Thus, at a point in space (point B of FIG. 2) as determined by the air vehicle reaching a predetermined altitude (perhaps 30 feet or so), a preprogrammed command will be given to reduce the rate of descent by reducing the glideslope angle. This glideslope for the final portion of the descent will be at a much smaller angle, causing a slower rate of descent that the initial glideslope. The actual glideslope will again be a function of the characteristics of the particular air vehicle because the final velocity of the air vehicle is dependent upon its stall speed. These velocities are part of the normal operating characteristics of an air vehicle and are readily determined.

After the command is given (from the landing system via the ground control unit and data link to the air vehicle) to change the rate of descent at point B (FIG. 2), the air vehicles adherence to the new glideslope is monitored by the seeker/sensor as before. When the air vehicle reaches a point just above the ground, (perhaps 3 feet or so) as indicated by point C in FIG. 2, the final command is given to simultaneously reduce engine power to idle and raise the nose (increase the pitch up angle) so the aircraft will touch down at the stall speed or just above, and then roll forward until its forward velocity is dissipated. The geometrical considerations, parameters to be measured and relationships to be used in calculating the necessary glideslope functions will be discussed in more detail later.

The second function of the automatic landing system (in addition to glideslope control) is heading control. This is achieved in a similar manner to the glideslope control except that the process is considerably simplified. From FIG. 3, it is seen that the seeker/sensor unit is set up offset to one side of the desired landing path (or runway) by a distance "s" (which will typically be about 50 feet but could be more or less). In the case of heading control, it is simply desired to cause the air vehicle to fly a straight path from the initial approach point to the point of intended landing or touch down. The seeker/sensor could be set up directly in the landing path but the implementation is more practical if it is offset to one side or the other (as will be discussed later). The seeker/sensor is initially set up and calibrated to have its null axis (in the horizontal direction) parallel to the desired approach path (as shown in FIG. 3). Then, at any and all points in its approach, the seeker/sensor (which is tracking the air vehicle in both pitch and yaw) will measure angle $\alpha$ and the range r to the air vehicle. These can be used to measure whether the air vehicle is on the flight path or to the right or left of it. If an error or deviation exists, a command is given to make a small turn right or left (as required) to correct it.

The geometrical relationships that are employed in performing the above operations will be discussed in the following paragraphs.

To understand the means by which the system measures and controls the glideslope or vertical descent of the air vehicle, refer to FIG. 2. Each air vehicle will have a best approach angle glideslope which is dependent upon its individual design. This glideslope is characterized by the angle $\theta$ which is the angle below horizontal (level) flight at which the air vehicle approaches the ground. Two right triangles describe the desired glideslope relationships. The first is made up of the height h of the air vehicle above a reference plane (made by extending the runway or landing field altitude to a point beneath the air vehicle), the desired glideslope, and the distance from the intersection of the glideslope with the reference plane to a point exactly below the air vehicle. This is shown on FIG. 2 as $H_a$, $D_a$, G with included angle $\theta$. It is desired to maintain $\theta$ as a constant so that for any distance $D_a$, there is a proper value of H which is calculated by:

$$H_a = \tan\theta\, D_a \tag{1}$$

Capital letters are used to denote the desired values (as opposed to the measured values). Thus, as the aircraft approaches the runway, the distance $D_a$ decreases and it is desired for $H_a$ to decrease according to equation (1). There is a similar triangle ($H_b$, $D_b$, G' and containing $\theta'$) which describes the desired glideslope relationship during the near ground portion of the approach when the glideslope angle is reduced to lower landing shock to the aircraft. The relationship of height to distance from glideslope intersection with the ground is:

$$H_b = \tan\theta'\, D_b \tag{1a}$$

Note that this is the same form as equation 1 except it is for the final glideslope triangle.

The second triangle describes the relationship between the radar sensor/seeker and the aircraft. This triangle is made up of the centerline of the tracking beam r which is also the measured range from the seeker to the air vehicle; the height h of the air vehicle above the reference plane less the height of the radar seeker above the reference plane ($\Delta$); and the distance ($d_m$) from the radar seeker to a point beneath the air vehicle. The included angle phi($\phi$) is a variable that is measured from the gimbal angles of the seeker. These parameters are expressed in the lower case to indicate measured parameters or parameters calculated from measurements. Thus, the measured height of the air vehicle (above the ground) is:

$$h=\sin\phi\, r+\Delta \tag{2}$$

Since height is only useful information when it is associated with a distance (from a known point, in this case the radar seeker/sensor), the distance relationship is given by:

$$d_m=\cos\phi\, r \tag{3}$$

This distance (calculated from the measured data) is then related to the distances in the glideslope triangles by:

$$D_a=d_m-X \tag{4a}$$

$$D_b=d_m-X' \tag{4b}$$

With the equations (and the known or arbitrary parameters), the information from the radar seeker/sensor (which is range r and angle $\phi$) can be used to compute the height and distance (actual, as well as desired height at the same distance). Among the arbitrary parameters are initial altitude to begin the approach ($H_a$ initial), glideslope angle, altitude where final glideslope is initiated ($H_b$ initial), and final glideslope angle. Although these are arbitrary, they are greatly influenced by the design of the aircraft and the terrain (including obstruction heights) surrounding the landing area. Also, the distance X' is arbitrarily chosen to allow for some overshoot in the approach, if desired.

Therefore, for any position of the air vehicle on or around the glideslope, a range r and an elevation angle $\phi$ are measured. Then using equation 2 and 3, the height h at a distance $d_m$ from the seeker/sensor is calculated. Equation 4 is used with the value of $d_m$ and the arbitrary X or X' to determine a distance $D_a$ or $D_b$ from which equation 1 is used to calculate the desired height ($H_a$ or $H_b$). Then the desired height ($H_a$ or $H_b$) is compared to the actual height h. If these two values are the same, no action is taken because the air vehicle is on the correct glideslope. If they are unequal, the following logic is implemented:

For $h<H$; add power and/or pitch up $h>H$; reduce power and/or pitch down

Upon the air vehicle reaching point B (as indicated by its descent to height $H_b$ at distance $D_b$), the air vehicle will be commanded to reduce its glideslope angle to a new value ($\theta'$ in FIG. 2). The same procedure will be followed as during the initial glideslope phase to measure and correct for altitude (height) errors.

The logic to be used in making the transition at points A, B, and C is essentially the same. At any point in time (after the seeker/sensor begins tracking the air vehicle), various computations are being made and corrections made as required to conform the actual flight path to the desired approach path. FIG. 8 is a flow diagram which illustrates, in general, how the logic and computation by the seeker/sensor computer is performed.

In order to better explain the process, a numerical example will now be described. This example will refer to FIGS. 2 and 8. The first thing to be done is to select those parameters that are arbitrary or related to the performance of an individual air vehicle. The initial altitude ($H_{ai}$), which is the height of the aircraft at the beginning of the automatic approach, is chosen to be 500 feet. The initial glideslope angle $\theta$ is selected as 20 degrees. These are values that might typically be used but many other values could also be selected. With these parameters chosen, the initial value of $D_a$ (FIG. 4) is calculated using equation 1:

$$D_{ai}=\frac{H_{ai}}{\tan\theta}=\frac{500}{\tan 20}=1374 \text{ feet}$$

Next the parameters of the final glideslope triangle ($H_b$, $D_b$, and $\theta'$ of FIG. 4) are considered. The initial value for $H_b$ ($H_{bi}$) is chosen as 30 feet while the glideslope ($\theta'$) is chosen as 5 degrees. Then the initial value of $D_b$ ($D_{bi}$) is calculated using equation 1(a):

$$D_{bi}=\frac{H_{bi}}{\tan\theta'}=\frac{30}{\tan 5}=343 \text{ feet}$$

From FIG. 2, it is observed that the initial and final glideslope triangles overlap and the distance they overlap ($D_o$) is the distance from the intersection of the initial glideslope with the reference plane (F) and the point where the initial $H_b$ value occurs (point B). This overlap distance is found using equation 1, with a parameter modification ($H_a=H_{bi}$; $D_a=D_o$). This is:

$$D_o=\frac{H_{bi}}{\tan\theta}=\frac{30}{\tan 20}=82 \text{ feet}$$

The final arbitrary choice to be made is the distance from the projected touch down point D to the sensor/seeker E (distance X' on FIG. 2). This could be zero if desired but it would normally be made 100–300 feet to allow for a slightly high approach (with longer than expected touch down). Let X'=200 feet for this example. From FIG. 2 it is seen that distance X can be calculated from X', $D_{bi}$, and $D_o$ (all of which have been selected or calculated). Therefore:

$$X=X'+D_{bi}-D_o$$

$$X=200+343-82=461 \text{ feet}$$

The only other parameters are the height of the sensor above the reference plane($\Delta$), which is chosen to be 3 feet and the height $H_{ci}$ (which is the height where landing is imminent) and the aircraft engine power is reduced to zero and the nose is raised to put the aircraft in the final landing attitude. This will be chosen to equal $\Delta$ (3 feet).

Thus, all the baseline parameters have been selected and calculated. It is obvious that these parameters can be varied to fit the existing conditions. For example, if there is a very small landing area, the value of $H_{ai}$ can be made lower and the angle $\theta$ can be made steeper to allow landing in less space. On the other hand, a large, fast aircraft may require a higher $H_{ai}$ and a less steep angle to accommodate its performance limitations.

Figure 8:
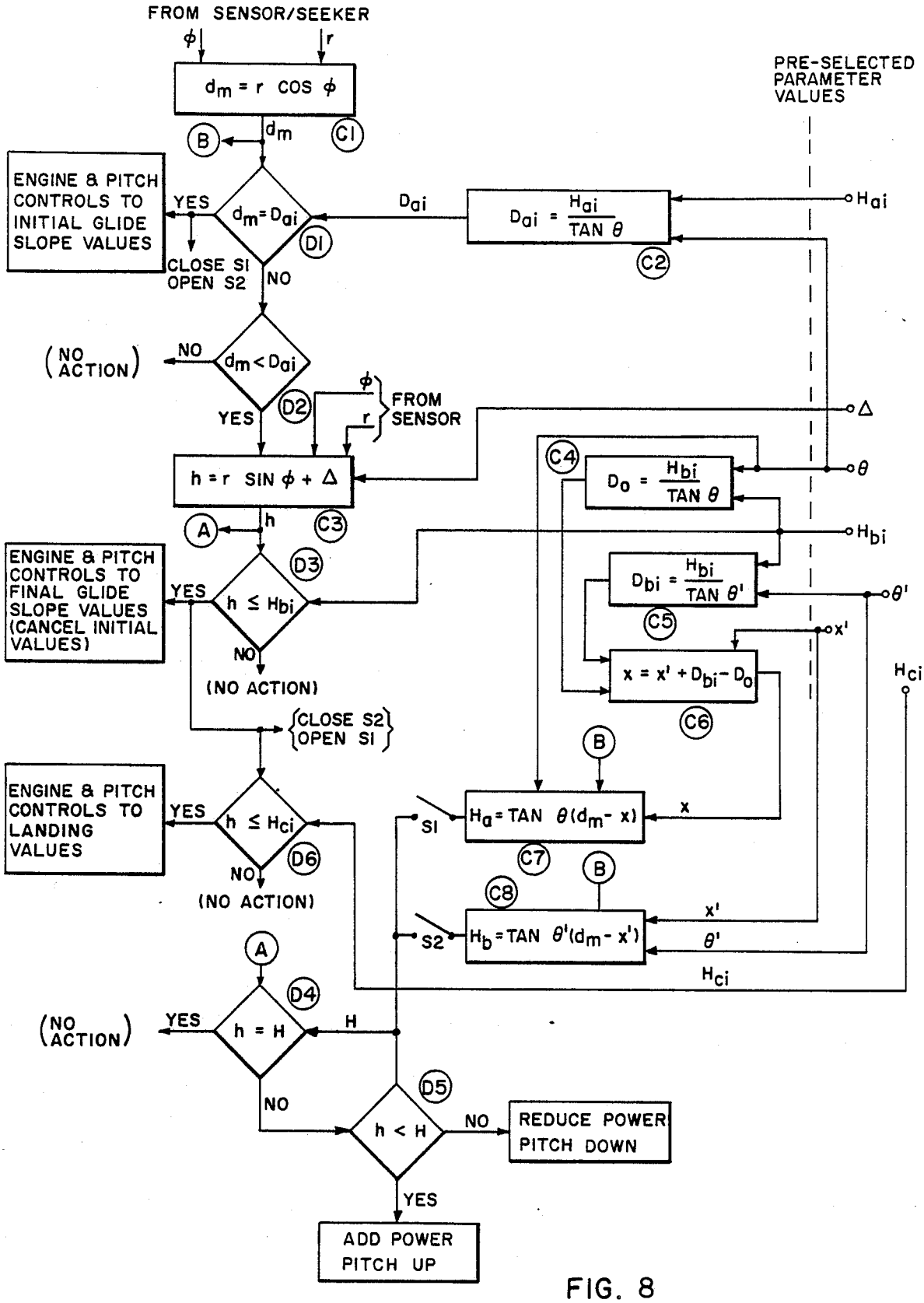
FIG. 8 is a logic flow diagram for the glideslope control system.

By referring to FIG. 8 as well as FIG. 2, the basic dynamic operation of the landing system can be described. On the upper right side of FIG. 8 is shown the arbitrary or constant values that are selected prior to use (either by normally entering data from a handbook or by calling up appropriate data from a computer memory device). These parameters are $H_{ai}$, $H_{bi}$, $\theta$, $\theta'$, $\Delta$, and X', whose values were calculated above. On the upper left of FIG. 8 is shown the dynamic measured parameters $\phi$ and r from the radar seeker/sensor. Starting at the top of FIG. 8, the angle $\phi$ and r measurements are used to calculate (in $C_1$) (continuously) the distance $d_m$ (shown on FIG. 2) using equation 3. Meanwhile, the initial value of distance $D_a$ (that point where the automatic approach begins) is calculated (in $C_2$) from the arbitrary values of $H_{ai}$ and using equation 1. Then, in the first decision block ($D_1$), the current value of $d_m$ is compared to $D_{ai}$ (which is calculated in $C_2$). If these values are not equal, then the next decision block $D_2$ checks to see if $d_m$ is less than $D_{ai}$ ($d_m < D_{ai}$). If the answer is no, the aircraft has not yet reached the point where the approach begins and no action is taken by the landing system. When $d_m$ does equal $D_{ai}$ the "yes" output of the first decision block $D_1$ sets the engine and pitch controls to their proper values for the initial glideslope. At the same time switch $S_1$ is closed, which injects the $H_a$ value (equation 1) into the logic for calculating and comparing height of the aircraft. Then as $d_m$ becomes less than $D_{ai}$ (which indicates that the aircraft has started down for the approach), the "yes" output of the second decision block $D_2$ is activated which causes the computation of the actual height of the aircraft to be calculated ($C_3$) (from equation 2) using the dynamic parameters $\phi$ and r and the static parameter $\Delta$. The output of this computation (h) goes to several more decision blocks. The first ($D_3$ on the diagram) tests to see if h is equal to or less than $H_{bi}$. During the phase of the approach between point A (where $H_{ai}$ is encountered) and point B (the point where $H_{bi}$ is encountered), this output will be "no" and no action will be taken as a result.

At this point it should be noted that on the right side of the logic diagram, $D_o$, $D_{bi}$, and X are calculated (in $C_4$, $C_5$, and $C_6$) from the fixed (or arbitrary) parameters (as discussed previously) and used along with the glideslope angles ($\theta$ and $\theta'$) and $d_m$ (calculated from the dynamic measurements of $\phi$ and r) to calculate the desired values of $H_a$ and $H_b$ (heights above the reference plane in the two glideslope triangles) in $C_7$ and $C_8$. Only one value of H ($H_a$ or $H_b$) is used at a time and switches $S_1$ and $S_2$ determine which.

During the period when the aircraft is on the initial glideslope (between points A and B), a negative output of decision block $D_3$ ($h \leqq H_{bi}$) causes no action and h is also equated with $H_a$ is decision block $D_4$ (since switch $S_1$ is closed and $S_2$ is open). If $H_a$ is equal to h (yes output of decision $D_4$), the aircraft is exactly on the desired glideslope and no action is taken. If this equality is not true, (a "no" output of decision $D_4$) then decision $D_5$ checks to see if h is less than $H_a$. If this is true ("yes" output), then the aircraft is below the glideslope so the power is increased and pitch up angle is increased. If this is not true ("no" output), the aircraft is above the glideslope so the power is reduced and the nose is pitched down to lose altitude.

This process continues to maintain the aircraft position on the glideslope. Since $d_m$ and h are being computed continuously, undesirable deviations in aircraft height are determined and corrected before they can become large.

When the aircraft height h equals $H_{bi}$, the "yes" output of decision $D_3$ ($h \leqq H_{bi}$) is actuated. This causes the engine and pitch controls to be set in their proper position for the final glideslope portion of the approach. In addition, this causes switch $S_2$ to close and $S_1$ to open. When these switches are activated, it causes h to be compared with $H_b$ in decision blocks $D_4$ and $D_5$ (rather than the previous $H_a$ value) Thus, the measured/calculated height will be compared to $H_b$ for controlling the height during this phase of the approach.

The final decision block ($D_6$) compares the aircraft height h to the pre-determined height $H_{ci}$ which occurs at point C in FIG. 2. This is the point where the aircraft is just above touch down and all power is removed and the aircraft nose is raised for touch down. Thus, a "no" response from decision 6 causes no action while a "yes" response causes all power to be removed, the nose to pitch up, and the approach is concluded as the aircraft touches down on the surface.

The lateral control for the automatic landing system is performed similarly but the problem is more simple because it is only necessary to constrain the aircraft to fly a desired heading from initial point A (of FIG. 3) to point C where landing is accomplished. FIG. 3 gives the necessary parameters to be measured and controlled by the yaw control system.

As mentioned previously, there are several possible implementations for the lateral (yaw axis) control of the air vehicle. One approach would be to command the air vehicle to fly directly toward the seeker so that (in the yaw direction) it was operation about null. In this case, any variation of the seeker yaw angle from null (zero degrees) will represent an angular error and command a corresponding change in aircraft yaw position. This would have the advantage of simplifying the seeker gimbal structure (in the yaw direction) but it would require that the distance from the sensor/seeker to the air vehicle be extremely long at the beginning of the approach because the total landing sequence, including the landing roll, must be accomplished before the air vehicle reaches the seeker/sensor. Also, in the event that the air vehicle touches down at a higher than normal speed, it might skid into the seeker/sensor and cause great damage. Even more significant, the seeker pitch angles would have very small changes if the distance from the seeker to points B and C are great. Therefore, it is much more practical (and more simple to implement) if the seeker/sensor is placed slightly beyond the desired touch down point and offset from the desired path by some distance (such as 50 feet). Then, the position of the air vehicle with respect to the desired lateral centerline can be geometrically calculated by using the range r, the seeker yaw angle $\alpha$, and the offset distance s.

The distance $d_m$ (FIG. 3) is the same distance $d_m$ utilized in FIG. 2 for glideslope control. Thus when $d_m$ is computed there it is also used in the lateral control system. The desired seeker yaw angle alpha ($\alpha$) is computed as:

$$\alpha_d = \tan^{-1}\frac{S}{d_m} \tag{6}$$

Where S is chosen arbitrarily and $d_m$ is computed in the glideslope process (equation 3). Then the measured angle $\alpha_m$ can be directly compared to the desired angle $\alpha_d$ and the following logic used for control commands:

if $\alpha_m < \alpha_d$; right rudder (turn right)

$\alpha_m = \alpha_d$; no change $\alpha_m > \alpha_d$; left rudder (turn left)

These commands would be very small corrections because the tracker is continuously calculating needed corrections and, therefore, errors would not have an opportunity to become large. FIG. 9 illustrates a potential logical implementation of this process.

If it is desired to continue tracking the air vehicle for lateral control after air vehicle touch down, the gimbal of the seeker is made to allow 180 degree freedom in yaw so it can track around as the air vehicle passes and continue tracking as the air vehicle moves away.

Figure 9:
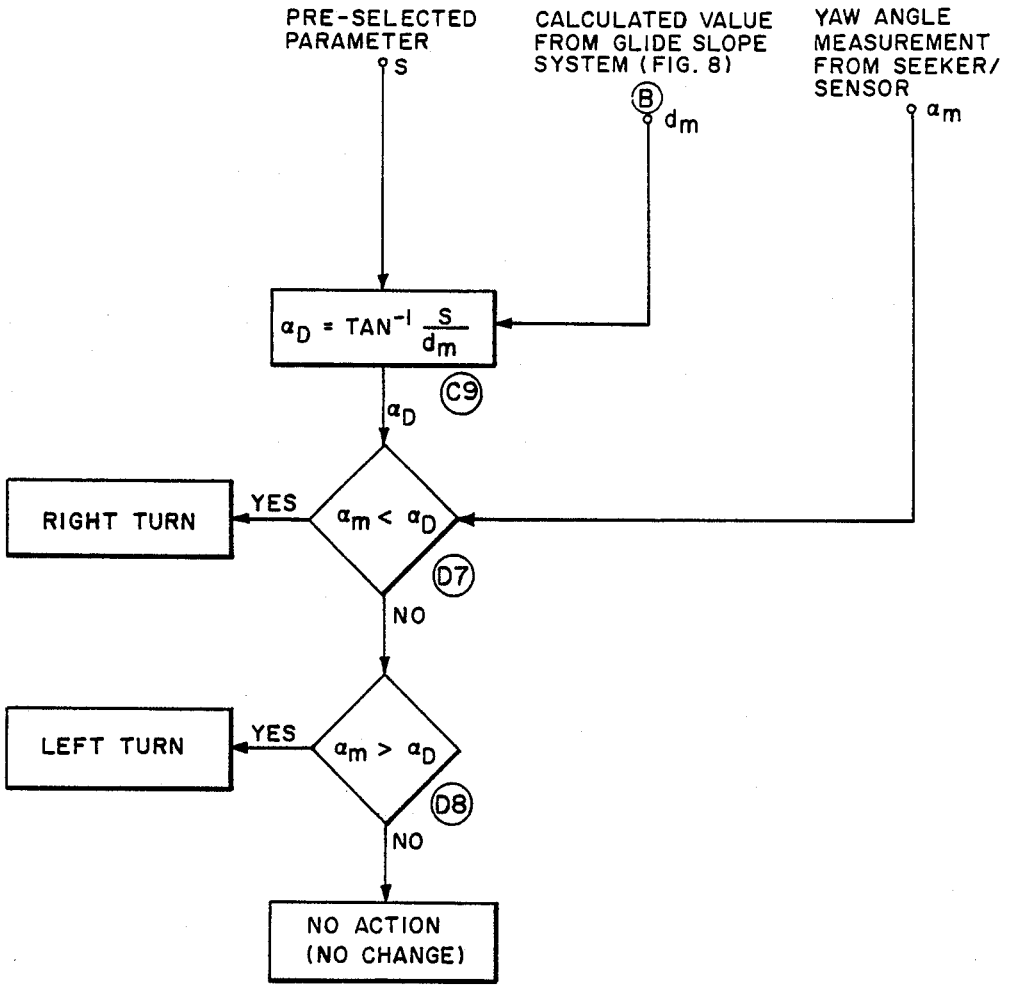
FIG. 9 is a logic flow diagram for the heading control system.

A numerical example using FIGS. 3 and 9 will help to explain further the operation of the directional control portion of the automatic landing system. The preselected value S (FIG. 7) is from the same source as the preselected values of FIG. 8 (e.g. computer memory, terminal keyboard, etc.) and is chosen as:

$$S = 50 \text{ feet}$$

Then (in FIG. 9), the desired yaw angle $\alpha_d$ is calculate in C9 using $d_m$ from FIG. 8 (glideslope control system) and the selected value of S using equation 6. This is compared with the measured yaw angle $\alpha_m$ from the seeker/sensor in decision block $D_7$. If $\alpha_m$ is less than $\alpha_d$, a command is given to turn right. If the output of this decision is "no", then a check is made ($D_8$) to see if $\alpha_m$ is greater than $\alpha_d$. If this output is "yes", a left turn is commanded. If the output is "no", then the aircraft is on the proper course and no action is taken.

Therefore, between the two sub-systems (glideslope and directional control) the aircraft can be automatically guided to a landing point from an initial point in flight.

I claim:

1. An automatic landing system for landing remotely piloted flying vehicles in a predetermined flight path and at a predetermined point, comprising;

(a) an auto pilot carried by said flying vehicle for measuring the parameters of attitude, airspeed, and heading and comparing the same to predetermined parameters for the desired attitude, airspeed and heading, and for adjusting the path of said aircraft whenever deviations from the desired parameters are detected;

(b) radar transmitter and receiver means disposed on a stabilized gimbal for measuring the angular deviation from a reference and the actual distance from said vehicle to said radar transmitter and receiver means on a continuous basis; and (c) control means for receiving signals from said radar, transmitter and receiver means indicating the pitch and yaw angle and the range from said radar transmitter and receiver means to the said vehicle, computing both actual and desired altitude and heading angle on a continuous basis and comparing said desired and actual altitudes and heading on a continuous basis from the initiation of landing approach until said vehicle reaches a pre-determined touch-down point, and for transmitting signals indicative of any deviation from said desired parameters to said autopilot for correcting any such deviations from said desired parameters whereby said remotely piloted flying vehicle is landed at a predetermined touchdown point and travels along a predetermined glideslope and heading during landing.

2. An automatic landing system as set forth in claim 1, wherein said radar transmitter and receiver means is offset from the landing path of said flying vehicle.

3. An automatic landing system as set forth in claim 1, wherein said radar transmitter and receiver means is supported upon a double gimbal for measuring the yaw and the pitch angles that the radar must move through to track said vehicle.

4. An automatic landing system as set forth in claim 1, wherein said radar transmitter and receiver is mounted on a portable base.

5. An automatic landing system as set forth in claim 4, wherein said portable base comprises a pedestal.

6. An automatic landing system as set forth in claim 4, wherein said base comprises a tripod.

* * * * *